United States Patent
Tanaka et al.

[19]

[11] Patent Number: 6,119,471

[45] Date of Patent: Sep. 19, 2000

[54] REFRIGERATOR FOR CONTAINER

[75] Inventors: Shigeto Tanaka; Akira Horikawa; Kenji Tanimoto; Hisaaki Takaoka, all of Osaka, Japan

[73] Assignee: Daikin Industries, Ltd., Osaka, Japan

[21] Appl. No.: 09/043,310

[22] PCT Filed: Sep. 27, 1996

[86] PCT No.: PCT/JP96/02832

§ 371 Date: Mar. 26, 1998

§ 102(e) Date: Mar. 26, 1998

[87] PCT Pub. No.: WO97/12185

PCT Pub. Date: Apr. 3, 1997

[30] Foreign Application Priority Data

Sep. 29, 1995 [JP] Japan ................................. 7-253676

[51] Int. Cl.[7] .................................................. F25B 49/02
[52] U.S. Cl. .............................. 62/130; 62/151; 340/585; 374/104
[58] Field of Search .............................. 62/125, 126, 127, 62/129, 130, 151, 155, 156; 236/94; 165/11.1; 702/130, 133; 374/102, 103, 104; 340/585, 588

[56] References Cited

U.S. PATENT DOCUMENTS

| | | | |
|---|---|---|---|
| 4,298,947 | 11/1981 | Tamura et al. | 702/130 |
| 4,604,871 | 8/1986 | Chiu et al. | 62/130 X |
| 5,123,251 | 6/1992 | Hanson | 62/89 |
| 5,262,758 | 11/1993 | Nam et al. | 62/129 X |
| 5,437,163 | 8/1995 | Jurewicz et al. | 62/126 |

FOREIGN PATENT DOCUMENTS

| | | |
|---|---|---|
| 58-127080 | 7/1983 | Japan . |
| 59-190619 | 10/1984 | Japan . |
| 04137019 | 5/1992 | Japan . |
| 496033 | 8/1992 | Japan . |
| 06129758 | 5/1994 | Japan . |
| 06186062 | 7/1994 | Japan . |
| 2 152 673 | 8/1985 | United Kingdom . |

*Primary Examiner*—Harry B. Tanner
*Attorney, Agent, or Firm*—Nixon Peabody LLP; Donald R. Studebaker

[57] ABSTRACT

Cooling operation is performed so as to keep a freezer at a selected temperature. Moreover, if the cooling operation enters a phase where the freezer temperature is higher than the selected temperature by a predetermined deviation or more, not only the deviation temperature but also an accumulated time obtained by accumulating the time periods during which the cooling operation is performed at the deviation temperature or higher are stored. In addition, when an instruction signal to indicate an accumulation is input, the stored accumulated time and deviation temperature are read out and indicated on a segment indicating section (7S).

3 Claims, 11 Drawing Sheets

REFRIGERATOR FOR CONTAINER

TECHNICAL FIELD

This invention relates to a refrigerating apparatus for container, and particularly relates to indication of a freezer temperature history.

BACKGROUND ART

Some conventional refrigerating apparatus for container has a temperature storage device as disclosed in Japanese Utility Model Laid-Open Gazette No. 4-96033. The temperature storage device amplifies a temperature signal from a temperature sensor for sensing a freezer temperature and then inputs a drive signal to a servomotor for a recording pen through a servo amplifier, thereby driving the recording pen. And, the temperature storage device makes the recording pen indicate and record a freezer temperature history on a recording sheet.

Problems to be Solved

Freezing containers having the above-mentioned refrigerating apparatus for container are transported for a long time by a container ship. The recording sheet is generally replaced, each time persons in charge of transportation alternate.

Thus, if the recording sheet has been replaced, a consignee of goods cannot know in what state the goods have been transported. In other words, the consignee cannot know a freezer temperature history during the transportation. This involves a problem that he cannot evaluate the quality of goods when he receives the goods.

In view of such a point, the present invention has been devised. The first invention is to enable an indication of an operating time during which a specified deviation has been caused with respect to a selected temperature, thereby allowing for the recognition of the whole freezer temperature history.

Another invention is to give an indication of the duration of a fast-cooling operation, thereby allowing for the recognition of a cooling condition history.

Still another invention is to store freezer temperatures at specified time intervals, more particularly to store an average freezer temperature or a peak freezer temperature during a defrosting operation, and to enable an indication of these temperatures, thereby allowing for the recognition of the whole freezer temperature history.

DISCLOSURE OF THE INVENTION

In order to accomplish the above-described objects, as shown in FIG. 1, the first solution taken by the present invention supposes a refrigerating apparatus for container, which includes a refrigerant circuit (40) including: a compressor (41); a condenser (42); an expansion mechanism (4E); and an evaporator (43) that are connected in this order, and which controls an operation of the refrigerant circuit (40) so as to cool a freezer.

And, cooling operation means (62) for performing a cooling operation such that a freezer temperature is kept at a selected temperature is also provided. Furthermore, accumulating and storing means (65) for storing a deviation temperature if the cooling operation enters a phase where the freezer temperature is higher than the selected temperature by a predetermined deviation or more, and for storing an accumulated time obtained by accumulating time periods during which the cooling operation is performed at the deviation temperature or higher is provided. In addition, accumulation data reading means (66) for reading out the accumulated time and the deviation temperature which are stored by the accumulating and storing means (65) when an instruction signal to indicate an accumulation is input thereto and for making an indicating section (7S) indicate the accumulated time and the deviation temperature thereon is provided.

In accordance with the first solution, during the cooling operation after a fast-cooling operation has been performed, the accumulating and storing means (65) accumulates operating time periods during which the deviation is equal to or larger than the predetermined deviation, and stores the accumulated operating time. For example, if the deviation temperature is set higher than the selected temperature by 1° C., the time periods during which the operation is performed at temperatures exceeding the deviation temperature are accumulated.

Thus, according to the first solution, since the time obtained by accumulating the time periods during which the operation is performed at temperatures higher than the selected temperature of a normal cooling operation by the predetermined deviation, and the deviation temperature are stored and the operation time and the deviation temperature can be indicated, the history of the freezer temperature can be known when goods are received or in a like situation. In particular, since recording sheets are not replaced with each other unlike a conventional case, the entire history during the transportation can be known. This ensures a correct evaluation of quality of the goods.

On the other hand, the second solution taken by the present invention provides: accumulating and storing means (65) for storing a deviation temperature if a cooling operation enters a phase where the freezer temperature is higher than the selected temperature by a predetermined deviation or more, and for storing an accumulated time obtained by accumulating predetermined time periods, every time the cooling operation continues for the predetermined time period at the deviation temperature or higher; and accumulation data reading means (66) for reading out the accumulated time and the deviation temperature, which are stored by the accumulating and storing means (65), when an instruction signals to indicate an accumulation is input thereto and for making an indicating section (7S) indicate the accumulated time and the deviation temperature thereon, instead of the accumulating and storing means (65) and the accumulation data reading means (66) of the first solution.

In accordance with the second solution, every time an operation continues with deviations equal to or larger than a predetermined deviation for a predetermined time period, the accumulating and storing means (65) accumulates and stores the operation time periods. For example, if a deviation temperature is set higher than the selected temperature by 1° C., the operation time periods, during which the deviation is a predetermined deviation or higher, are accumulated every five minutes.

Thereafter, if the freezer temperature history is to be recognized, when an instruction signal to indicate an accumulation is input, the accumulated time and the deviation temperature which are stored by the accumulating and storing means (65) are read out and indicated on the indicating section (7S).

Thus, according to the second solution, since the time periods, during which the operation is performed with a predetermined deviation or more, are accumulated every time a predetermined time has passed, it is possible to suppress the provision of unnecessary information to a consignee of goods or the like. That is to say, if a simple accumulation is performed, one may receive an impression that the operation deviated from the selected temperature has been performed for a long time. If these time periods are accumulated every time a predetermined time period has passed, the provision of unnecessary information can be prevented while maintaining constant accuracy.

Moreover, the third solution taken by the present invention supposes a similar refrigerating apparatus for container to that of the first solution. And, pull-down operation means (61) for performing a fast-cooling operation that fast-cools the freezer; and cooling operation means (62) for performing a cooling operation such that a freezer temperature is kept at a selected temperature after the fast-cooling operation has been performed by the pull-down operation means (61) are provided. In addition, pull-down indication instructing means (64) for outputting an instruction signal to make an indicating section (7S) indicate an operation time of the fast-cooling operation performed by the pull-down operation means (61) and the freezer temperature is provided.

In accordance with the third solution, if the pull-down operation means (61) performs a fast-cooling operation, the pull-down indication instructing means (64) outputs an instruction signal to make the indicating section (7S) indicate the freezer temperature and the fast-cooling operation time. For example, an indication that the present freezer temperature is "30° C." and the pull-down operation time is "124 hours" is provided.

According to the third solution, the pull-down operation time and the freezer temperature are indicated during the pull-down operation. Thus, if it is under fast-cooling operation, a consignee of goods or the like can know the fast-cooling operation time when he receives the goods or in a like situation. As a result, the quality of the goods can be evaluated easily.

Furthermore, the fourth solution taken by the present invention supposes a similar refrigerating apparatus for container to that of the first solution. And, cooling operation means (62) for performing a cooling operation such that a freezer temperature is kept at a selected temperature is provided. In addition, temperature storing means (67) for storing the freezer temperature at predetermined time intervals is also provided, the freezer temperature being an average freezer temperature during each of the time intervals.

In accordance with the fourth solution, the temperature storing means (67) stores the freezer temperature at predetermined time intervals or an average freezer temperature during each of the time intervals. For example, an average freezer temperature is stored every 30 minutes.

According to the fourth solution, an average freezer temperature over each predetermined time interval during the operation is stored at regular time intervals. Thus, the freezer conditions can be reflected more accurately as compared with the case that a certain instantaneous temperature during any time interval is stored.

Furthermore, the fifth solution taken by the present invention provides, instead of the temperature storing means (67) of the fourth solution, temperature storing means (67) for storing the freezer temperature at predetermined time intervals, and for storing a peak temperature of the defrosting operation performed by the defrosting operation means (63) as the freezer temperature if the peak temperature is caused during each of the predetermined time intervals.

In accordance with the fifth solution, if a peak temperature is caused during each of the predetermined time intervals, the temperature storing means (67) stores the peak temperature as the freezer temperature at predetermined time intervals or as the freezer temperature during the defrosting operation.

According to the fifth solution, a peak temperature during the defrosting operation is stored. Thus, it is possible to accurately determine whether or not a normal operation has been performed. More specifically, if a certain instantaneous temperature during each time interval is stored, the peak temperature is not stored in some cases. On the other hand, the defrosting operation is performed at specified time intervals in principle. Thus, if the peak temperature has not been stored, then one is likely to misunderstand that a normal operation has not been performed. However, since the peak temperature is stored without fail, it is possible to accurately determine whether or not a normal operation has been performed.

Furthermore, the sixth solution taken by the present invention provides, instead of the temperature storing means (67) of the fourth solution, temperature storing means (67) for storing the freezer temperature at predetermined time intervals, and for storing an average freezer temperature during each of the time intervals as the freezer temperature if the defrosting operation of the defrosting operation means (67) continues all through each time interval and if a peak temperature is not caused during each time interval.

In accordance with the sixth solution, if a peak temperature is not caused during each time interval, the temperature storing means (67) stores an average freezer temperature during each of the time intervals as the freezer temperature at predetermined time intervals or as the freezer temperature during the defrosting operation. That is to say, an average freezer temperature during the defrosting operation is stored as it is.

According to the sixth solution, if the defrosting operation is not finished but continued over a predetermined time interval, an average freezer temperature is stored. Thus, the actual freezer condition can be indicated accurately, and the quality of goods can be evaluated correctly.

Furthermore, the seventh solution taken by the present invention provides temperature data reading means (68) for reading out the freezer temperature stored by the temperature storing means (67) when an instruction signal to indicate a temperature is input thereto and for making the indicating section (7S) indicate the freezer temperature for one of the fourth to the sixth solutions.

In accordance with the seventh solution, when an instruction signal to indicate a temperature is input, the temperature data reading means (68) reads out the freezer temperature stored by the temperature storing means (67) and makes the indicating section (7S) indicate the temperature.

According to the seventh solution, since an average freezer temperature is read out and indicated, a freezer temperature history can be known accurately and promptly. Thus, the quality of goods can be evaluated accurately.

BEST MODE FOR CARRYING OUT THE INVENTION

Hereinafter, embodiments of the present invention will be described in detail with reference to the drawings.

Figure 1:
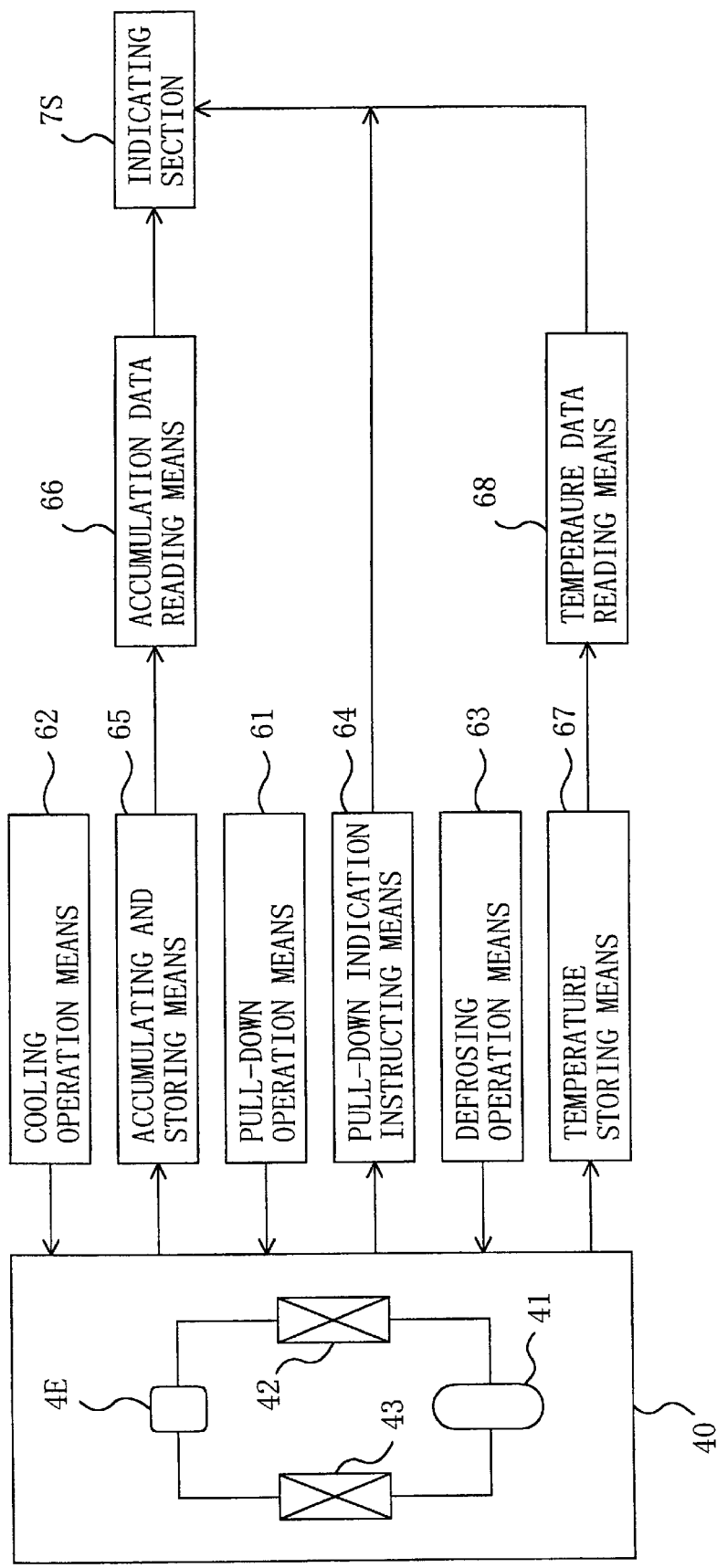
FIG. 1 is a block diagram showing a configuration of the present invention.
Figure 2:
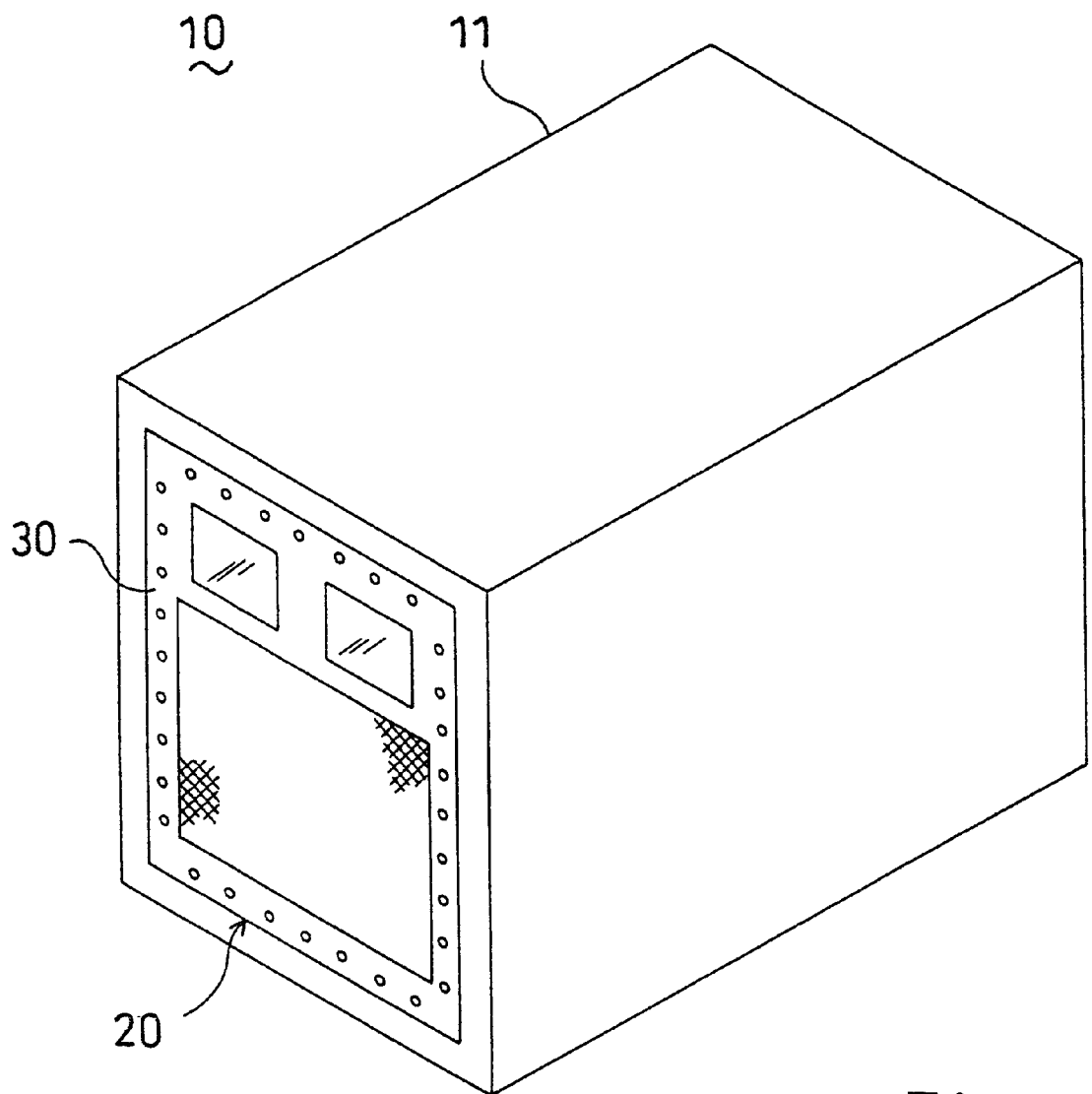
FIG. 2 is a perspective view of a freezing container.
Figure 3:
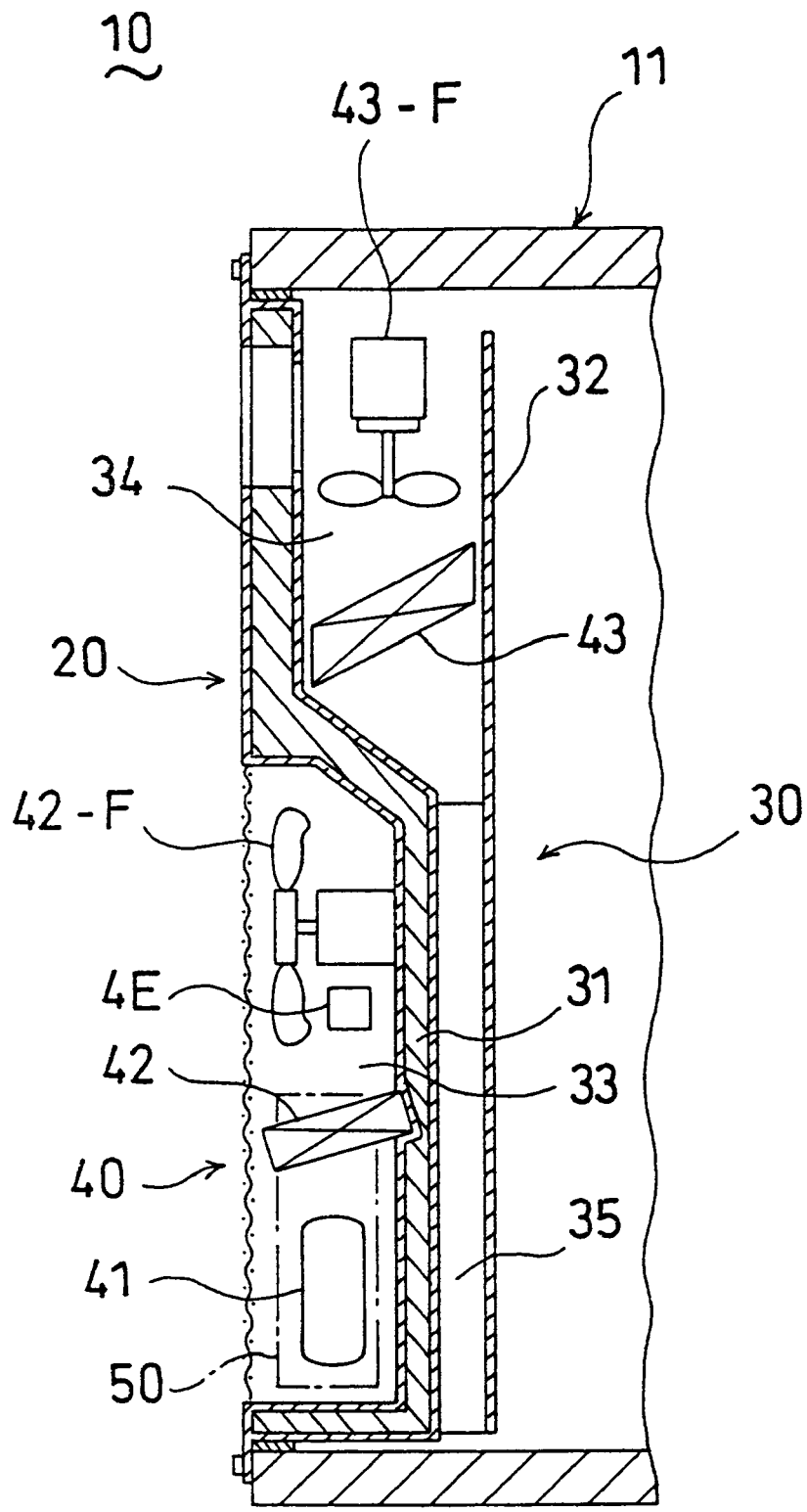
FIG. 3 is a cross-sectional view of a refrigerating apparatus.

As shown in FIGS. 2 and 3, a freezing container (10) is loaded with various kinds of goods and is transported by a container ship or a container car while keeping the goods in a cooled condition.

The freezing container (10) is formed such that a refrigerating apparatus (20) for container is fitted to a container body (11). The container body (11) is formed as a cubic box having an opening formed in one surface (left side surface in FIG. 2).

The refrigerating apparatus (20) also serves as a cover for closing the opening of the container body (11) and is constructed so as to include a refrigerant circuit (40) inside a casing (30) formed so as to have a specified thickness. The casing (30) is formed such that a partition (32) is provided inside a body wall (31) so as to be parallel thereto. The body wall (31) is made of a heat insulator or the like and is fittingly secured to the container body (11). An inwardly recessed mounting space (33) for units is formed in the lower half thereof.

Between the body wall (31) and the partition (32), a cooling space (34) is formed so as to be located above the mounting space (33). Inside the mounting space (33), an air passage (35) is formed so as to be continuous with the cooling space (34). The upper end of the cooling space (34) and the lower end of the air passage (35) are communicated with the inner space of the freezer located inside the container body (11).

The refrigerant circuit (40) is constituted by a compressor (41), a condenser (42), an expansion mechanism (4E) and an evaporator (43), which are connected to each other in this order. The compressor (41) and the condenser (42), together with a condenser fan (42-F), are placed in the mounting space (33). The evaporator (43), together with an evaporator fan (43-F), are placed in the cooling space (34). And the refrigerant circuit (40) circulates a refrigerant by making the condenser (42) condense the refrigerant compressed by the compressor (41), making the expansion mechanism (4E) reduce the pressure thereof, making the evaporator (43) evaporate the refrigerant and then making the refrigerant return to the compressor (41). On the other hand, the air in the freezer of the container body (11) flows into the cooling space (34), is cooled by the evaporator (43), passes through the air passage (35) and then flows out into the container body (11), thereby cooling the freezer.

Figure 4:
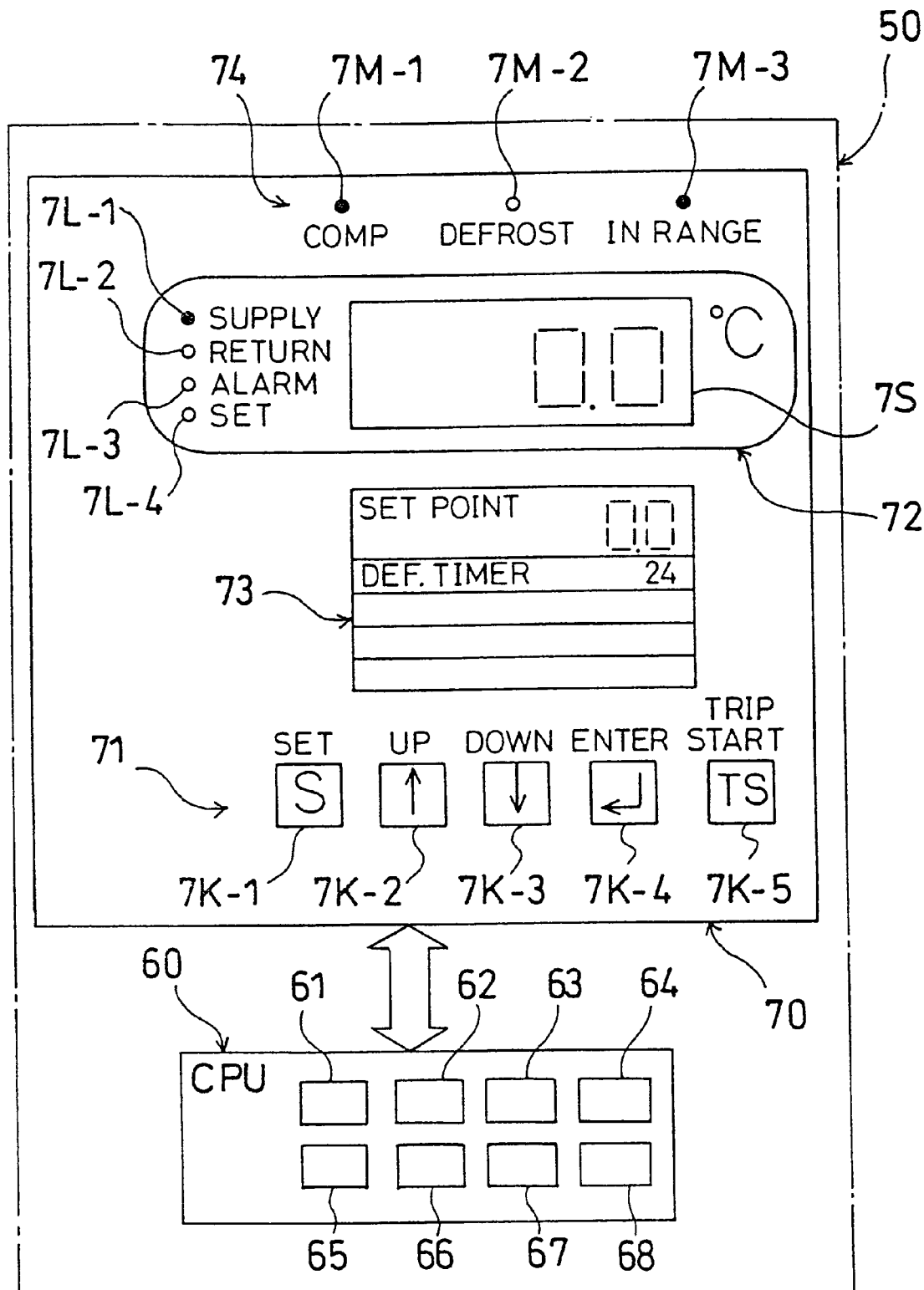
FIG. 4 is a diagram showing an arrangement of a controller.

A controller (50) for controlling the cooling operation of the refrigerant circuit (40) is placed in the mounting space (33) and controls the capacity and the like of the compressor (41) so as to keep the freezer temperature at a selected temperature. As shown in FIG. 4, the controller (50) is formed such that an indication and input section (70) is coupled to a CPU (60) as a central processing unit. The CPU (60) is provided with not only pull-down operation means (61) for the start of the cooling operation, but also cooling operation means (62) and defrosting operation means (63).

The pull-down operation means (61) operates the compressor (41) with full load at the start of the operation so as to perform a fast-cooling operation and controls the refrigerant circuit (40) such that the freezer temperature is quickly lowered to a controlled temperature range (hereinafter, referred to as an in-range).

The cooling operation means (62) performs a cooling operation once the freezer temperature is lowered to reach the in-range as a result of the pull-down operation, and controls the refrigerant circuit (40) such that the freezer temperature is kept within the in-range. The in-range is set so as to be a specified temperature range with respect to the selected temperature. For example, the in-range is set to be a temperature range of ±1° C. with respect to the selected temperature. If the selected temperature is 0° C., a chilled mode is entered. If the selected temperature is −20° C., a frozen mode is entered.

The defrosting operation means (63) performs a defrosting operation by using hot gas or an electric heater when the evaporator (43) is frosted. For example, during the pull-down operation, the defrosting operation means (63) performs the defrosting operation every four hours. During the cooling operation in which the freezer temperature is kept within the in-range, the defrosting operation means (63) performs the defrosting operation at selected time intervals such as every 12 or 24 hours. If the freezer temperature exceeds the in-range and such a high-temperature state lasts for 30 minutes, the defrosting operation means (63) performs the defrosting operation.

The indication and input section (70) inputs a selected temperature, indicates the freezer temperature and is provided with an input key group (71), a first indicating part (72), a second indicating part (73) and a lamp indicating part (74). The input key group (71) includes a set key (7K-1) for inputting a selected temperature and the like, an up key (7K-2) and a down key (7K-3) for changing the indicated contents, an enter key (7K-4) for switching the modes, and a trip start key (7K-5) for writing the start of an operation control.

The first indicating part (72) is provided with a 4-digit segment indicating section (7S), and is also provided with a supply temperature indicating section (7L-1), a return temperature indicating section (7L-2), an alarm indicating section (7L-3) and a setting indicating section (7L-4), each of which gives an indication using a light-emitting device.

The second indicating part (73) is formed so as to indicate information data such as a selected temperature and the like.

The lamp indicating part (74) is provided with a compressor indicating section (7M-1), a defrost indicating section (7M-2) and an in-range indicating section (7M-3), each of which indicates the operating condition using a light-emitting device.

Pull-Down Indication

The present invention is characterized in that the CPU (60) is provided with pull-down indication instructing means (64).

The pull-down indication instructing means (64) outputs an instruction signal to alternately indicate the operating time of the fast-cooling operation performed by the pull-down operation means (61) and the freezer temperature on the first indicating part (72) of the indication and input section (70) at specified time intervals.

Figure 5:
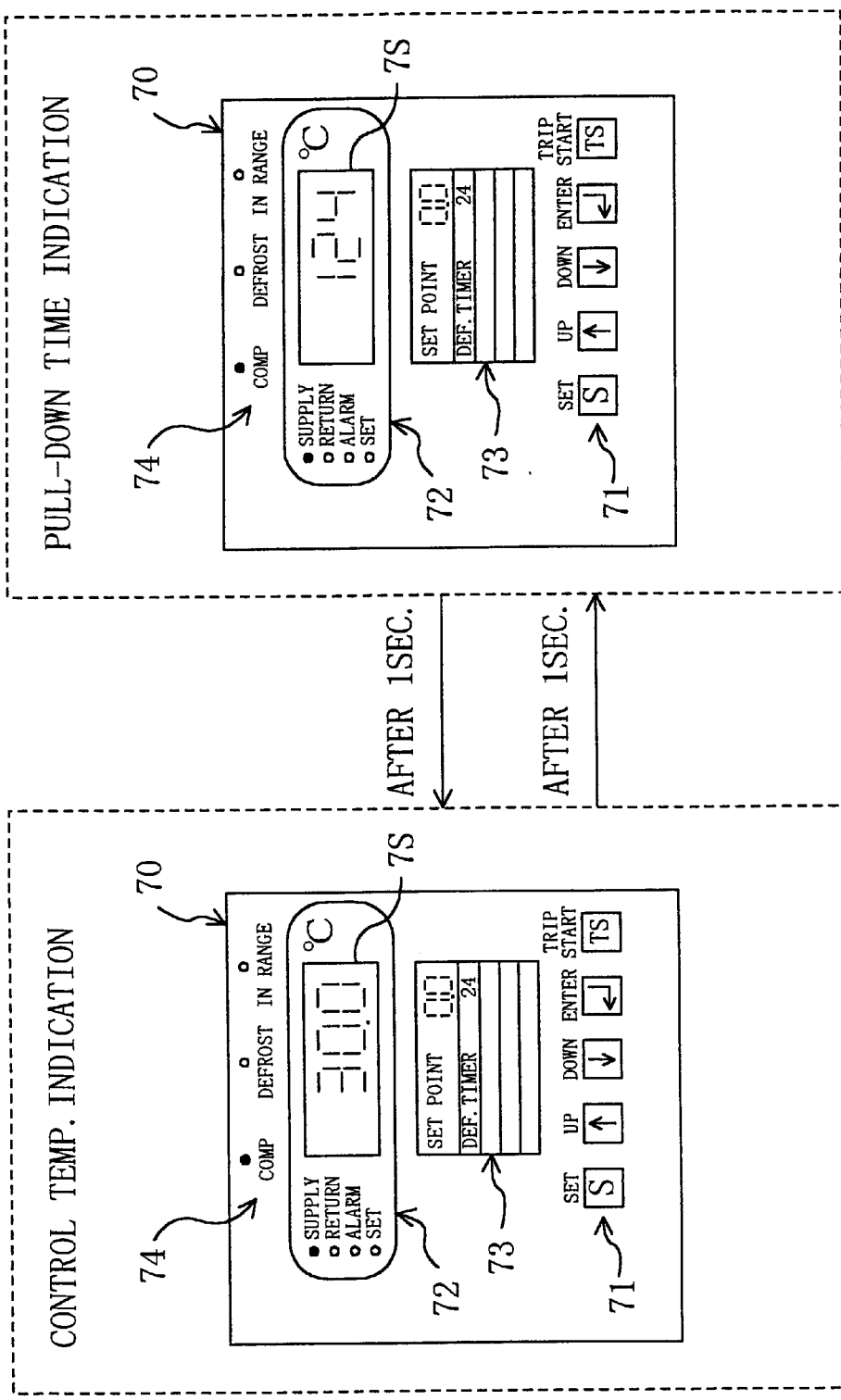
FIG. 5 is a front view of an indication and input unit giving a pull-down indication.

Hereinafter, the indicating operation of the pull-down indication instructing means (64) will be described with reference to FIG. 5. For example, when the freezing container (10) is loaded with goods and a cooling operation is started, the pull-down operation means (61) operates the compressor (41) with full load so as to perform a fast-cooling operation. Then, the pull-down indication instructing means (64) outputs an instruction signal to the indication and input section (70), thereby indicating the freezer temperature and a fast-cooling operation time (pull-down operation time) on the first indicating part (72). For example, in the case of FIG. 5, an indication that the present freezer temperature is "30° C." and an indication that the pull-down operation time is "124 hours" are alternately given so as to be switched every second.

The freezer temperature is supposed to be high during the pull-down operation. Therefore, for a consignee of goods or the like receiving the freezing container (10), the pull-down operation time is more important rather than the freezer temperature during the pull-down operation, from the viewpoint of quality control. Accordingly, it is indicated as a kind of freezer temperature history how long the pull-down operation has continued, thereby providing judgment data when the freezing container (10) is received during the pull-down operation.

The alternate switching indication of the freezer temperature and the fast-cooling operation time is given until the freezer temperature enters the in-range. At the time, in the indication and input section (70), the supply temperature indicating section (7L-1) of the first indicating part (72) is lighted and the compressor indicating section (7M-1) of the lamp indicating part (74) is also lighted. The second indicating part (73) indicates that the selected temperature is "0° C." and that a 24-hour defrosting timer for defrosting every 24 hours is set.

Accordingly, when a consignee of goods or the like receives the goods, he looks at the indication and input section (70) and can recognize the operation time if it is under the fast-cooling operation (pull-down operation), thereby using it as data for evaluating the quality of the goods.

Accumulation History Indication

The present invention is also characterized in that the CPU (60) is provided with accumulating and storing means (65) and accumulation data reading means (66).

The accumulating and storing means (65) stores a deviation temperature if the cooling operation enters a phase where the freezer temperature is higher than the selected temperature by a predetermined deviation or more, and also stores an accumulated time obtained by accumulating time periods during which the cooling operation is performed at the deviation temperature or higher.

The accumulation data reading means (66) reads out the accumulated time and the deviation temperature which are stored by the accumulating and storing means (65) when an instruction signal to indicate an accumulation is input thereto, and makes the first indicating part (72) of the indication and input section (70) indicate them.

Hereinafter, the storage operation of the accumulating and storing means (65) and the indication operation of the accumulation data reading means (66) will be described with reference to FIGS. 5 and 6.

First, once the freezer temperature enters the in-range after the fast-cooling operation of the pull-down operation means (61) has been completed, the cooling operation means (62) controls the capacity and the like of the compressor (41) to keep the freezer temperature within the in-range.

Figure 7:
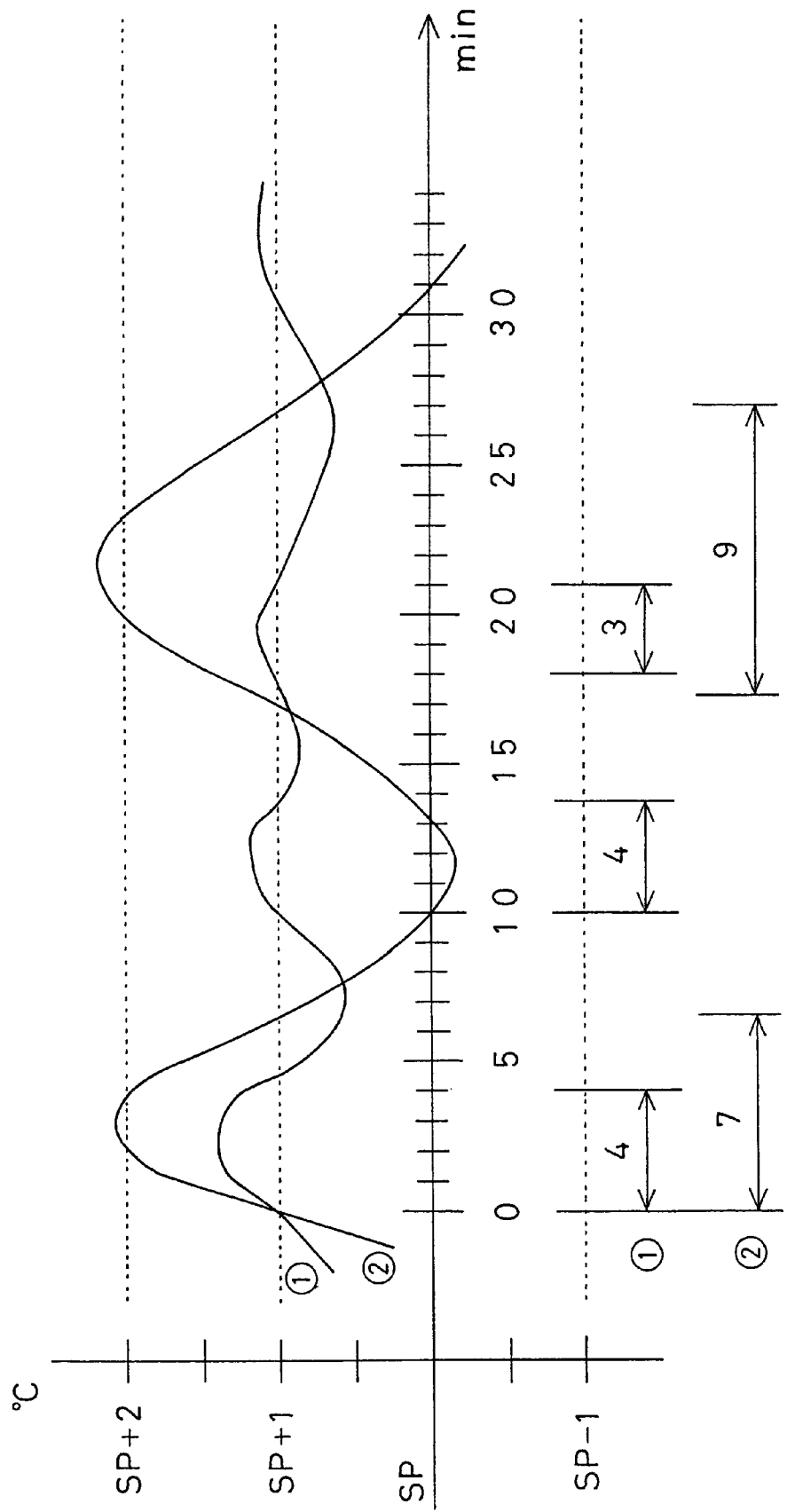
FIG. 7 is a characteristic diagram of freezer temperatures plotted against accumulated times.

During the cooling operation, i.e., during a normal operation, the accumulating and storing means (65) accumulates and stores the time periods during which the operation is performed with the predetermined deviation or more. For example, in FIG. 7, if a temperature SP+1 for accumulation having a deviation of +1° C. with respect to a selected temperature SP is set, then the time periods during which the operation is performed at temperatures higher than the deviation temperature (+1) are accumulated. In the case of the temperature characteristic ① of FIG. 7, the operation time periods ① shown in the lower part of FIG. 7 are accumulated. In this case, the accumulating and storing means (65) adds up 4 minutes, 4 minutes and 3 minutes and stores 11 minutes.

Figure 6:
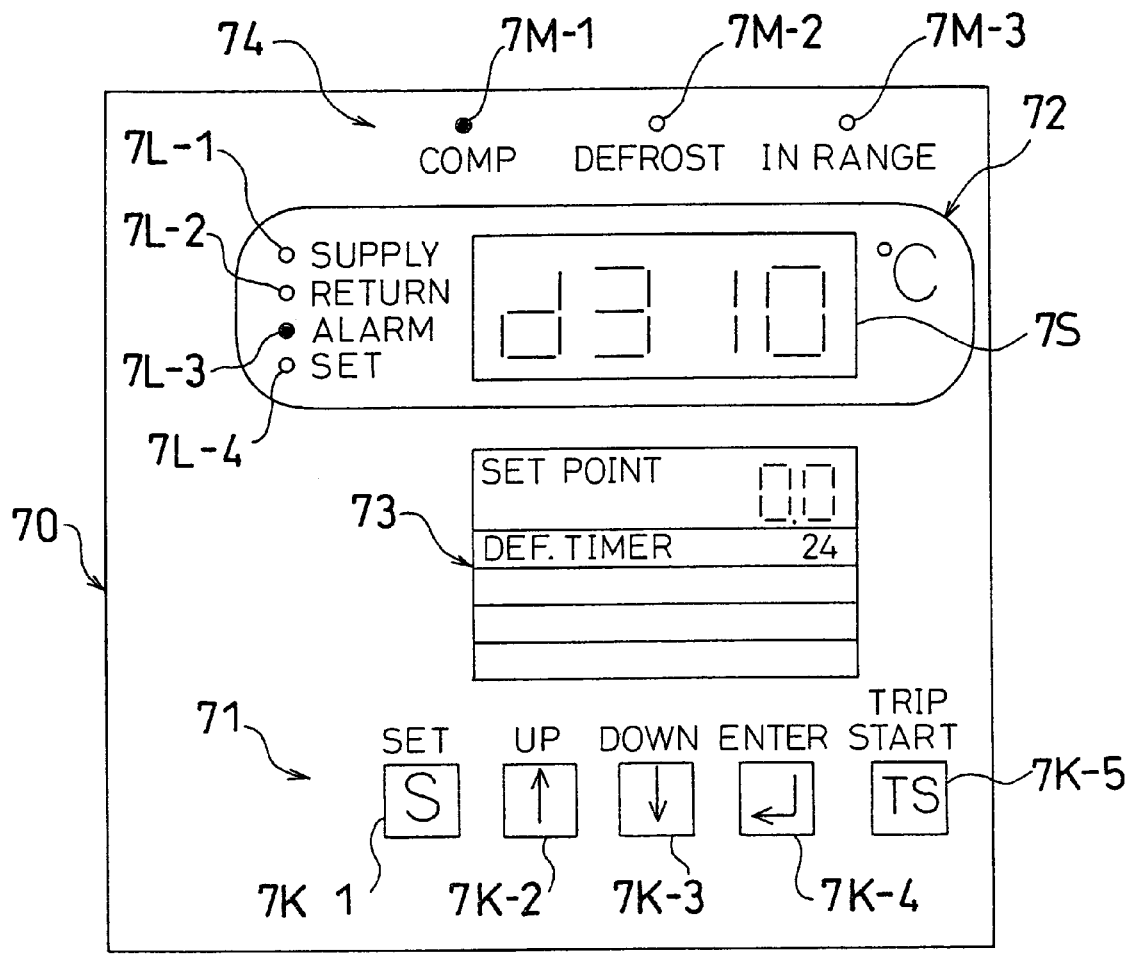
FIG. 6 is a front view of the indication and input unit giving an accumulation history indication.

Thereafter, if a consignee of goods or the like wishes to know the freezer temperature history when he receives the goods or in a like situation, he lights the alarm indicating section (7L-3) using the up key (7K-2) and the down key (7K-3) of the indication and input section (70) as shown in FIG. 6. A d code is provided as one information item of alarm. Thus, if the d code is set, an instruction signal to indicate an accumulation Is input. And, the accumulation data reading means (66) reads out the accumulated time and the deviation temperature which are stored by the accumulating and storing means (65) and indicates them on the segment indicating section (7S). For example, in FIG. 6, an indication that the deviation temperature is SP+3 with a deviation of 3° C. and an indication that the time during which the operation lasted at a temperature 3° C. higher than the selected temperature SP is 10 hours are given.

If a temperature SP–1 for accumulation having a deviation of –1° C. with respect to the selected temperature SP is set, the time during which the operation is performed at a temperature lower by 1° C. is indicated as "d–1□" in FIG. 6.

Temperature History Indication

The present invention is also characterized in that the CPU (60) is provided with temperature storing means (67) and temperature data reading means (68).

The temperature storing means (67) is means for storing the freezer temperature at predetermined time intervals. The temperature storing means (67) stores an average freezer temperature during the cooling operation performed by the cooling operation means (62) as the freezer temperature during each of the time intervals, stores a peak temperature as the freezer temperature during the defrosting operation performed by the defrosting operation means (63) if the peak temperature is caused during each of the predetermined time intervals, and stores an average freezer temperature during each of the time intervals as the freezer temperature if the defrosting operation of the defrosting operation means (67) continues all through each said time interval and if a peak temperature is not caused during each said time interval. For example, the temperature storing means (67) stores the freezer temperature every 30 minutes.

When an instruction signal to indicate a temperature is input, the temperature data reading means (68) reads out the freezer temperature stored by the temperature storing means (67) and makes the first indication part (72) of the indication and input section (70) to indicate it.

Hereinafter, an operation of indicating a temperature as a history indication will be described. The temperature storing means (67) stores the freezer temperature of the freezing container (10) under transportation during a normal operation, except for the pull-down operation. Thus, the indication operation will be described before the storage operation is described.

If a consignee of goods or the like wishes to recognize the freezer temperature history when he receives the goods or in a like situation, he continues to push the enter key (7K-4) of the indication and input section (70) for 3 seconds. By operating the enter key (7K-4) in this manner, an instruction signal to indicate a temperature is input. The temperature data reading means (68) reads out the freezer temperatures stored by the temperature storing means (67) every 30 minutes and indicates them on the segment indicating section (7S).

Figure 8:
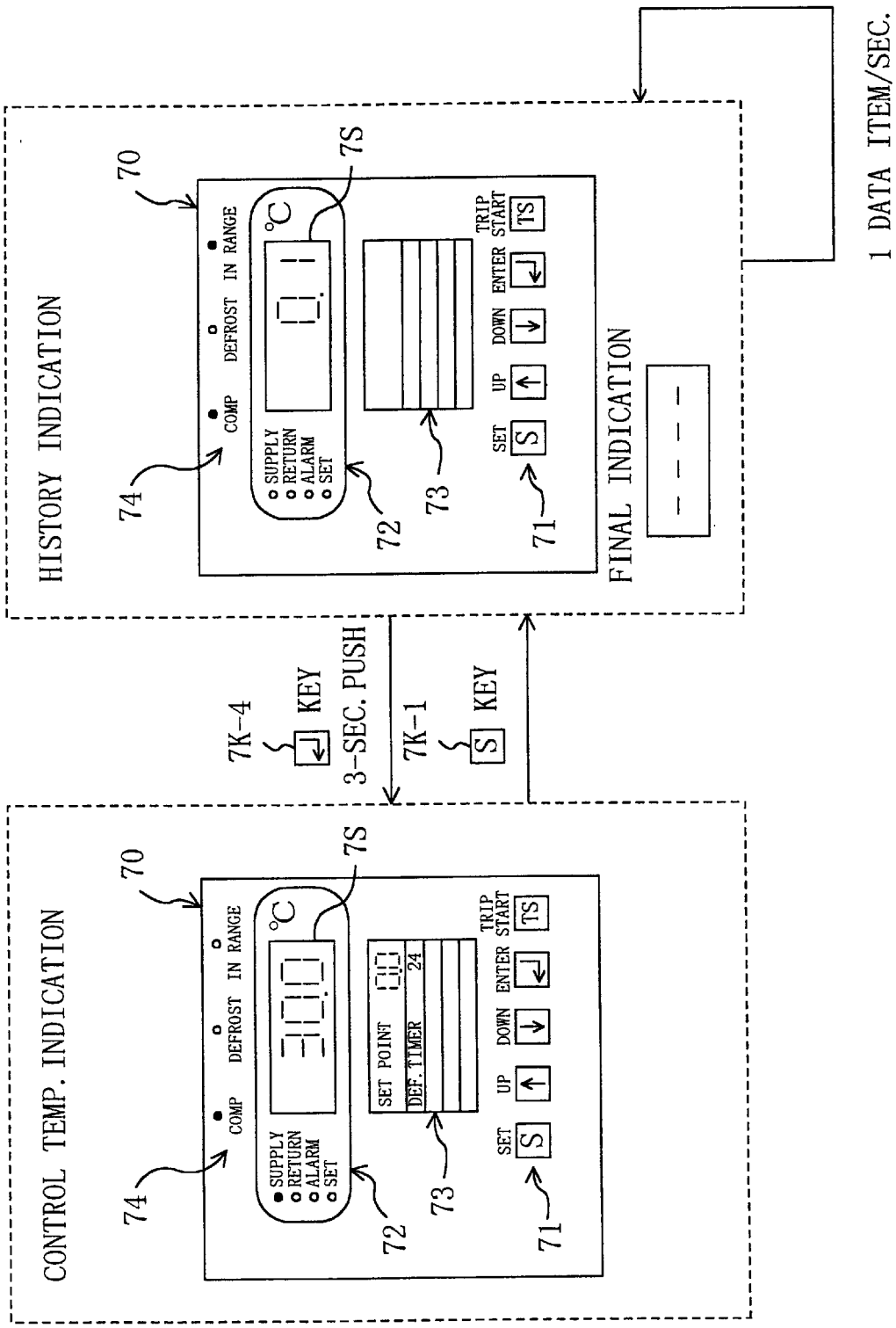
FIG. 8 is a front view of the indication and input unit giving a temperature history indication.

For example, in FIG. 8, the freezer temperature on the segment indicating section (7S) is switched from 30° C. into 0.1° C. and the light of the second indicating part (73) is put out. And, the freezer temperature data are sequentially indicated retrogressively from the latest data every second. In a situation where such an indication operation is to be aborted during this indication, if the set key (7K-1) of the indication and input section (70) is pushed, then the indication is switched into that of the present freezer temperature.

Next, the storage operation performed by the temperature storing means (67) during the cooling operation will be described with reference to control flow charts of FIGS. 9 and 10.

First, when a pull-down operation is completed after the operation was started, DATA ① about the freezer temperature detected by a supply temperature sensor (not shown) is retrieved in Step ST1. Subsequently, the program proceeds to Step ST2, in which a one-minute timer for sampling is started, and then proceeds to Step ST3, in which it is determined whether or not logging should be started.

Figure 11:
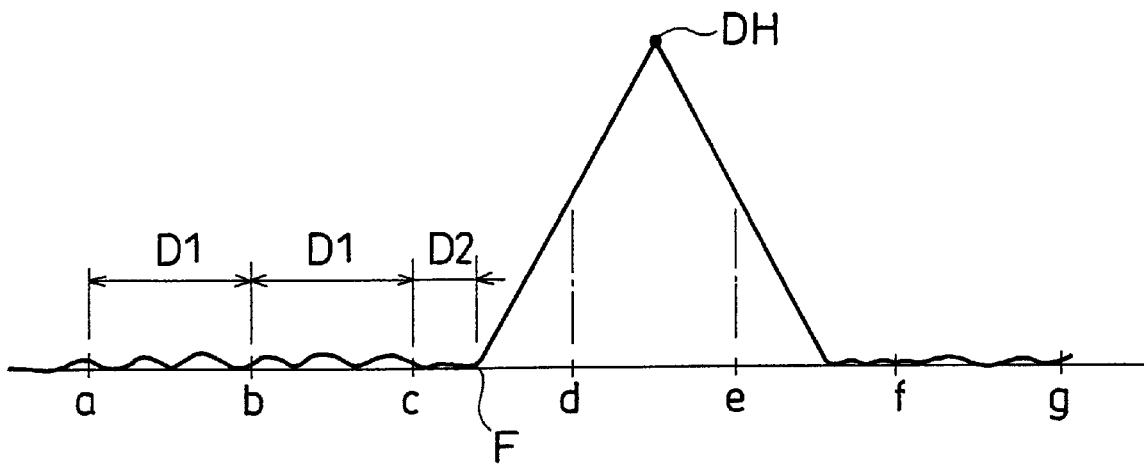
FIG. 11 is a characteristic diagram showing freezer temperatures.
Figure 12:
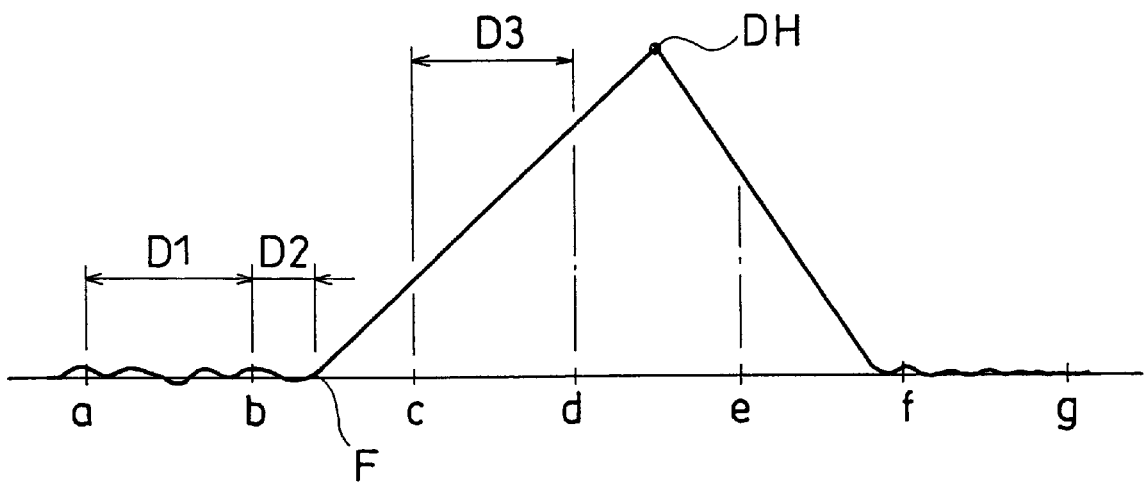
FIG. 12 is a characteristic diagram of freezer temperatures showing another storing operation.

The time when logging is started is one of the times when data is written every 30 minutes as shown by Points a to g of the freezer temperature characteristics in FIGS. 11 and 12. Since the logging should not be started during the time period between Points a and b and the like, the program proceeds from Step ST3 to Step ST4, in which it is determined whether or not a defrosting operation should be started.

During a normal cooling operation after the pull-down operation has been performed, the defrosting operation is supposed to be performed in principle at predetermined intervals such as every 12 hours or every 24 hours. Thus, if the defrosting operation is not to be performed, the program proceeds from Step ST4 to Step ST5, in which it is determined whether or not the timer has counted up.

Until the timer, set in Step ST2, counts up, the program proceeds to Step ST3 and the above operation is repeated. On the other hand, when the timer counts up, that is to say, when one minute passes since the retrieval of DATA ①, the program proceeds from Step ST5 to Step ST6, in which next DATA ② about the freezer temperature is retrieved. And, the program proceeds to Step ST7, in which an average value between DATA ① and DATA ② is calculated and the calculated data is rewritten into DATA ①. Then, the program returns to Step ST2 and the above-described operation is repeated.

In other words, data about the freezer temperature is retrieved every one-minute sampling time and an average value between the data and the previous data is rewritten into DATA ①.

Thereafter, when 30 minutes passes, for example, when Points b or c in FIG. 11 and Point b in FIG. 12 is reached, it is time to start the logging. Thus, the program proceeds from Step ST3 to Step ST8, in which DATA ① as an average value calculated in Step ST7 every minute is logged and the program is restarted. Specifically, during a normal cooling operation, an average freezer temperature obtained every 30 minutes is logged and stored, and the operation is restarted from Step ST1 as shown by D1 in FIG. 11.

Next, when the defrosting operation is started, for example, when Point F in FIG. 11 is reached, the program proceeds from Step ST4 to Step ST5, in which it is determined whether or not the logging should be started. Until it is time to start the logging, the program proceeds from Step ST9 to Step ST10, in which it is determined whether or not the defrosting operation has been completed. Until the defrosting operation is completed, the program returns to Step ST9 and the determination whether or not logging should be started and the determination whether or not the defrosting operation has been completed are repeated.

Specifically, in FIG. 11, the defrosting operation is started in the middle between Points c and d and an average freezer temperature D2 until the start of the defrosting operation is calculated as DATA ① in Step ST7. Accordingly, when it is time to start the logging (see Point d in FIG. 11), the program proceeds from Step ST9 to Step ST11, in which the average freezer temperature D2 between Point a and a start time F of the defrosting operation is written as DATA ①, and then proceeds to Step ST10.

Thereafter, the defrosting operation is completed at a time between Points d and e in FIG. 11 and the program proceeds from Step ST10 to Step ST12. However, in the vicinity of the point in time when the defrosting operation is completed, a peak temperature DH of the freezer temperature is caused. Thus, the peak temperature DH is substituted for DATA ①, and the program proceeds to Step ST13 and waits in Step ST13 until it is time to start the logging.

And when Point e in FIG. 11 is reached, the logging should be started. Thus, the program proceeds from Step ST13 to Step ST14, in which the peak temperature DH is written as DATA ①. Then, the program is restarted and the operation is repeated from Step ST1.

Thereafter, an average freezer temperature between Points e and f and an average freezer temperature between Points f and g, each calculated in Step ST7, are written at Points f and g in FIG. 11, respectively.

Figure 9:
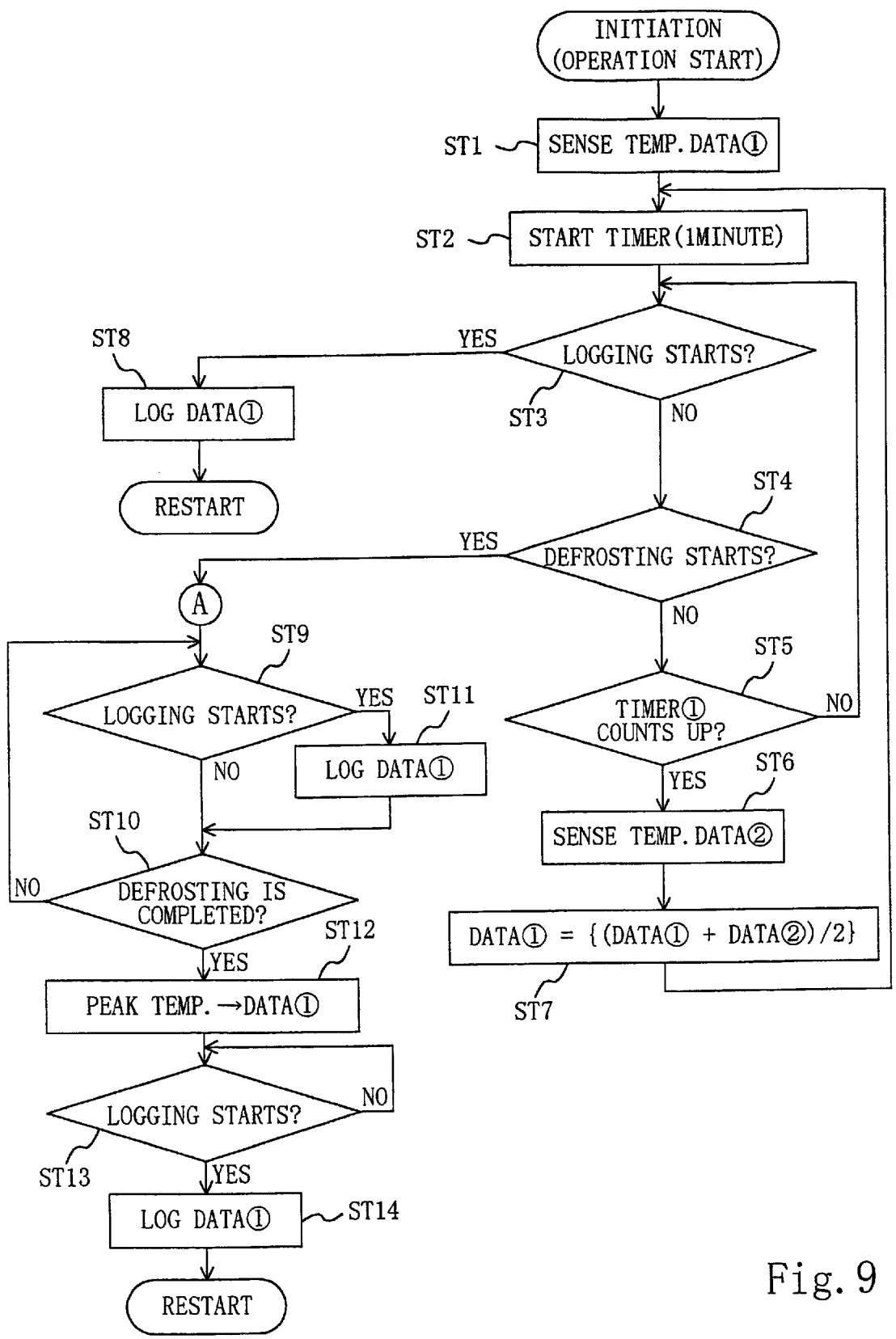
FIG. 9 is a control flow chart illustrating an operation of storing the freezer temperature.
Figure 10:
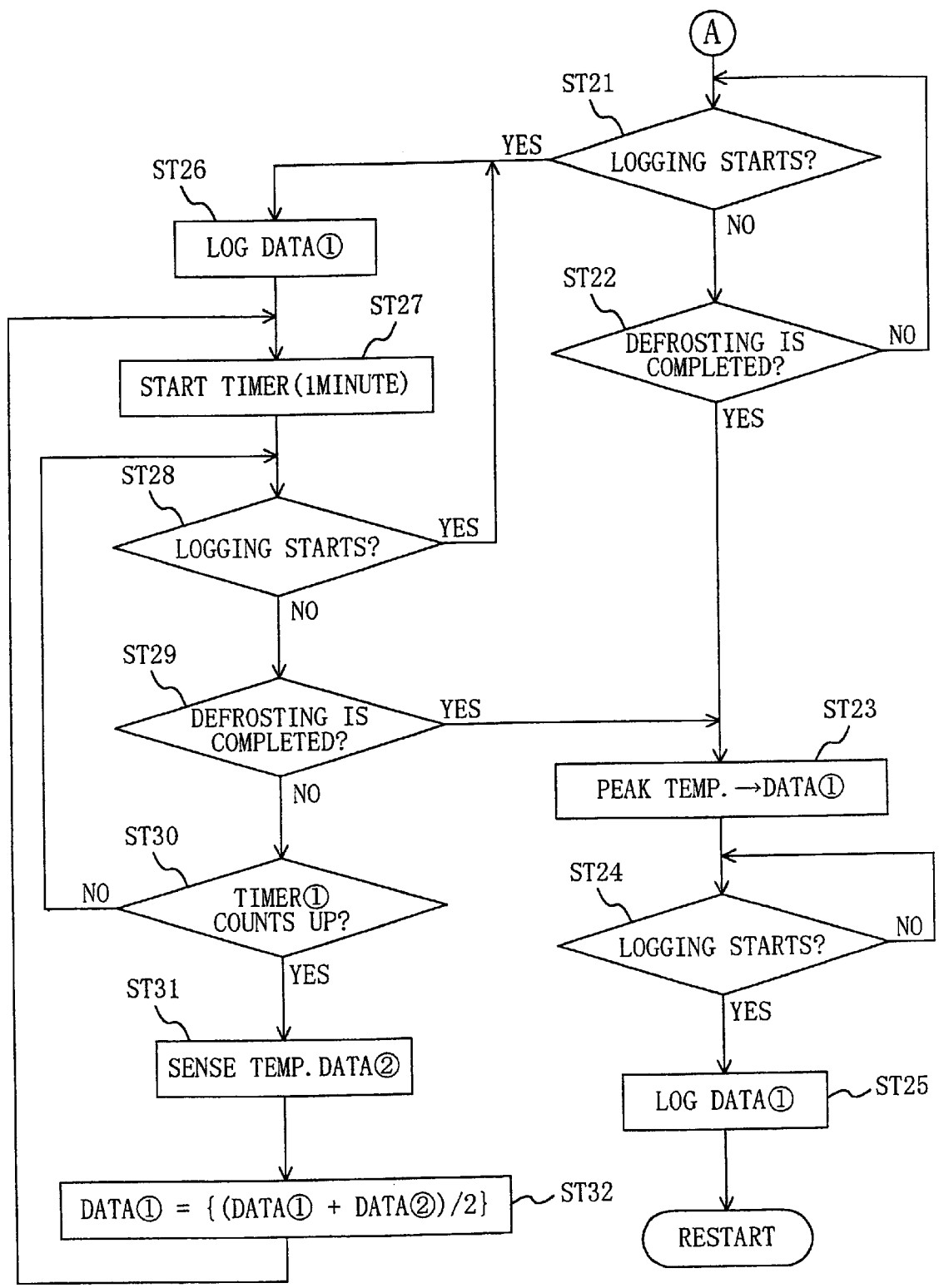
FIG. 10 is another control flow chart showing an operation of storing the freezer temperature.

On the other hand, if the defrosting operation is performed over three time intervals, the operation is performed as shown in FIG. 10. In the control flow as shown in FIG. 10, the same operations as those of Step ST1 to Step STB in FIG. 9 are performed and the program proceeds from Portion A in FIG. 9 to Step ST21. Specifically, when the defrosting operation is started at Point F in FIG. 12, it is determined in Step ST21 whether or not the logging should be started. Until it is time to start the logging, the program proceeds to Step ST22, in which it is determined whether or not the defrosting operation has been completed. Until the defrosting operation is completed, the program returns to Step ST21, in which the determination whether or not the logging should be started and the determination whether or not the defrosting operation has been completed are repeated.

And, if the defrosting operation is completed before it is time to start the logging, the operations from Step ST23 to Step ST25 are performed and the peak temperature DH is written as DATA ① in the same way as in Steps ST12 to ST14 of FIG. 9.

On the other hand, when Point c in FIG. 12 is reached, the program proceeds from Step ST21 to Step ST26, in which an average freezer temperature D2 between Point b and a start time F of the defrosting operation is written as DATA ①. Subsequently, the program proceeds to Step ST27, in which the timer is started in the same way as in Step ST2, and then proceeds to Step ST28, in which it is determined whether or not it is time to start the logging.

Until it is time to start the logging, the program proceeds from Step ST28 to Step ST29, in which it is determined whether or not the defrosting operation has been completed. Until the defrosting operation is completed, the program proceeds to Step ST30, in which it is determined whether or not the timer has counted up. Until the timer counts up, the program returns from Step ST30 to Step ST28.

When the timer counts up, the program proceeds from Step ST30 to Step ST31. That is to say, when one minute passes since the retrieval of DATA ①, next DATA ② about the freezer temperature is retrieved. And, the program proceeds to Step ST32, in which an average value between the DATA ① and DATA ① is calculated and the calculated data is rewritten into DATA ①. Then, the program returns to Step ST27 to repeat the above-described operations.

More specifically, every one-minute sampling time, data about the freezer temperature is retrieved and an average value between the data and the previous data is substituted for DATA ①. And when the 30-minutes time interval passes, for example, when Point d in FIG. 12 is reached, it is time to start the logging. Thus, the program returns from Step ST28 to Step ST26, in which DATA ① as an average value calculated in Step ST32 every minute is logged, and the operations from Step ST27 are performed. That is to say, since the defrosting operation is being performed and the freezer temperature is rising between Points c and d in FIG. 12, an average freezer temperature obtained every 30 minutes is logged and stored as it is, as shown by D3 in FIG. 12.

On the other hand, between Points d and e in FIG. 12, an average freezer temperature is calculated in Step ST32. However, since the defrosting operation has been completed, the answer to the query in Step ST29 is YES. Thus, the program returns to Step ST23. Consequently, as described above, the peak temperature DH is written as DATA ① at Point e in FIG. 12 (see Steps ST23 to ST25). Thereafter, at Points f and g in FIG. 12, the same operations as those in FIG. 11 are performed.

Effects of this Embodiment

As described above, in this embodiment, the pull-down operation time and the freezer temperature are alternately indicated during the pull-down operation. Accordingly, if it is under the fast-cooling operation when a consignee of goods or the like receives the goods, he can know the fast-cooling operation time thereof. As a result, the quality of the goods can be evaluated easily.

In addition, the time periods during which the operation is performed with a predetermined deviation with respect to a selected temperature for a normal cooling operation and the deviation temperatures are stored, and the operation times and the deviation temperature can be indicated. Accordingly, a consignee of goods or the like can recognize the freezer temperature history when he receives the goods or in a like situation. In particular, since a recording sheet is not replaced unlike a conventional case, the whole history during the transportation can be known. As a result, the quality of the goods can be evaluated correctly.

Furthermore, an average freezer temperature over each predetermined time interval during a normal operation is stored at regular time intervals. Thus, the freezer conditions can be reflected more accurately as compared with the case that a certain instantaneous temperature is stored for the time interval. And, since the average freezer temperature is read out and indicated, a freezer temperature history can be known accurately and promptly. As a result, the quality of goods can be evaluated accurately.

Moreover, a peak temperature DH during the defrosting operation is stored. Thus, it is possible to accurately determine whether or not a normal operation has been performed. More specifically, if a certain instantaneous temperature during a time interval is stored, the peak temperature DH is not stored in some cases. On the other hand, the defrosting operation is performed at specified time intervals in principle. Thus, if the peak temperature DH has not been stored, then one is likely to misunderstand that a normal operation has not been performed. However, since the peak temperature DH is stored without fail, it is possible to accurately determine whether or not the normal operation has been performed.

Furthermore, if the defrosting operation is continued during a predetermined time interval, an average freezer temperature is stored. Accordingly, the actual freezer condition can be correctly indicated. As a result, the quality of goods can be evaluated correctly.

Other Embodiments

In the above-described embodiment, the accumulating and storing means (65) simply accumulates the time periods during which the cooling operation is performed with a deviation temperature or higher. However, in an alternative embodiment, accumulation may be performed every specified time segment. Specifically, if a cooling operation enters a phase where the freezer temperature is higher than a selected temperature by a predetermined deviation or more, the accumulating and storing means (65) stores not only the deviation temperature but also an accumulated time obtained by accumulating specified time periods every time the cooling operation is performed at the deviation temperature or higher for the specified time period.

More specifically, in FIG. 7, if a temperature SP+1 for accumulation having a deviation of +1° C. with respect to a selected temperature SP is set, every time the operation continues at temperatures higher than the accumulated temperature SP+1 for 5 minutes, the 5-minute periods are accumulated by a 5-minute counter, for example. As a result, in the case of the temperature characteristic ② of FIG. 7, the 7-minute period is accumulated as a 5-minute period and the 9-minute period is also accumulated as another 5-minute period for the operation time periods ② shown in the lower part of FIG. 7. In this case, the accumulating and storing means (65) adds 5 minutes and 5 minutes and stores 10 minutes. It is noted that if the operation is continued for 10 minutes, then the 5-minute counter counts twice. Thus, a 10-minute period is stored.

Thus, since the time periods during which the operation is performed at temperatures higher than the predetermined deviation temperature SP+1 are accumulated every time the predetermined time has passed, it is possible to suppress the provision of unnecessary information to a consignee of goods or the like. That is to say, if a simple accumulation is performed, one may receive an impression that the operation deviated from the selected temperature has been performed for a long time. If these time periods are accumulated every time the predetermined time period has passed, the provision of unnecessary information can be prevented while maintaining constant accuracy.

In the period between Points c and d of FIG. 12, an average freezer temperature during the defrosting operation is stored as it is. However, in the case where no peak temperature DH is caused during the time interval, the previous average freezer temperature may be indicated in accordance with another aspect of the invention. For example, the average freezer temperature D2 may be copied as it is as for the time period between Points c and d in FIG. 12.

INDUSTRIAL APPLICABILITY

As described above, the refrigerating apparatus for container of the present invention is useful for recognizing the whole freezer temperature history, for recognizing the cooling condition history, and for recognizing an average freezer temperature or a peak freezer temperature during the defrosting operation.

What is claimed is:

1. A Refrigerating apparatus for container characterized by comprising:

a refrigerant circuit (40) including a compressor (41), a condenser (42), an expansion mechanism (4E) and an evaporator (43), which are connected in this order, the refrigerating apparatus controlling an operation of the refrigerant circuit (40) so as to cool a freezer;

cooling operation means (62) for performing a cooling operation such that a freezer temperature is kept at a selected temperature;

temperature storing means (67) for storing freezer temperatures at predetermined time intervals in order of time, each of the freezer temperatures being an average freezer temperature during each said time interval; and temperature data reading means (68) for reading out the freezer temperatures stored by the temperature storing means (67) when an instruction signal to indicate a temperature is input thereto and for making the indication section (7S) indicate each of the freezer temperatures.

2. A refrigerating apparatus for container, characterized by comprising: a refrigerant circuit (40) including a compressor (41), a condenser (42), an expansion mechanism (4E) and an evaporator (43), which are connected in this order, the refrigerating apparatus controlling an operation of the refrigerant circuit (40) so as to cool a freezer;

cooling operation means (62) for performing a cooling operation such that a freezer temperature is kept at a selected temperature;

defrosting operation means (63) for performing a defrosting operation in place of the cooling operation means (62), if the evaporator (43) is frosted during the cooling operation performed by the cooling operation means (62); and temperature storing means (67) for storing the freezer temperature at predetermined time intervals, and for storing a peak temperature of the defrosting operation performed by the defrosting operation means (63) as the freezer temperature if the peak temperature is caused during each said predetermined time interval.

3. The refrigerating apparatus for container of claim 2, characterized by further comprising temperature data reading means (68) for reading out the freezer temperature stored by the temperature storing means (67) when an instruction signal to indicate a temperature is input thereto and for making the indicating section (7S) indicate the freezer temperature.

* * * * *